United States Patent [19]

Galula et al.

[11] Patent Number: 4,763,103

[45] Date of Patent: Aug. 9, 1988

[54] PROCESS AND METHOD FOR WIDE BAND TRANSMISSION, PARTICULARLY FOR DATA TRANSMISSION OVER AN ELECTRICITY DISTRIBUTION NETWORK

[75] Inventors: William Galula, Montrouge, France; Timothy J. Ridgers, Alpharetta, Ga.

[73] Assignee: Enertec, Montrouge, France

[21] Appl. No.: 829,055

[22] Filed: Feb. 13, 1986

[30] Foreign Application Priority Data

Feb. 14, 1985 [FR] France ............................... 85 02135

[51] Int. Cl.$^4$ ............................................. H04M 11/04
[52] U.S. Cl. ............................ 340/310 R; 340/310 A; 375/1
[58] Field of Search ........ 340/310 R, 310 A, 310 RP, 340/825.58; 375/1, 9, 115, 80, 20, 83, 89; 455/266

[56] References Cited

U.S. PATENT DOCUMENTS

| | | |
|---|---|---|
| 3,909,527 | 9/1975 | Ohta . |
| 3,953,798 | 4/1976 | Sjostrand et al. . |
| 4,239,940 | 12/1980 | Dorfman .................. 340/310 R |
| 4,306,308 | 12/1981 | Nossen .................... 375/115 |
| 4,307,380 | 12/1981 | Gander . |
| 4,553,101 | 11/1985 | Mathis .................... 375/115 |
| 4,583,231 | 4/1986 | Puckette ................... 375/1 |
| 4,597,087 | 6/1986 | Kadin ..................... 375/1 |
| 4,616,364 | 10/1986 | Lee ........................ 375/1 |

FOREIGN PATENT DOCUMENTS 0041193 12/1981 European Pat. Off. .

OTHER PUBLICATIONS

IEEE Transactions on Aerospace and Navigational Electronics, vol. ANE-11, No. 4, Dec. 1964, pp. 285-291, New York, US; K. W. Otten.

*Primary Examiner*—John W. Caldwell, Sr.
*Assistant Examiner*—Mahmoud Fatahi-Yar

[57] ABSTRACT

At transmission (10) each bit for transmission is coded as a function of its state by producing (12) a particular coding frequency combination, these being divided into two distinct bands spaced one from another and the coding combinations being chosen such that frequencies ranked in the same sequence place in these combinations do not occupy the same frequency band. A signal comprising the coding combination is injected to the network (N,P) and at reception (20), is applied to demodulators (22, 23), each assigned to one respective frequency band, to be correlated with locally generated signals (25, 26) which reproduce the coding combinations with a constant frequency shift, the bit state being determined (24) as a function of the correlation output.

11 Claims, 7 Drawing Sheets

PROCESS AND METHOD FOR WIDE BAND TRANSMISSION, PARTICULARLY FOR DATA TRANSMISSION OVER AN ELECTRICITY DISTRIBUTION NETWORK

BACKGROUND OF THE INVENTION

1. Field of the Invention

The present invention concerns a process and method for wide band transmission particularly for data transmission over an electricity distribution network, in particular a low voltage network.

2. Description of the Prior Art

A particular but not exclusive area of application of the invention is that of automatic transmission to a central point of meter readings of electricity or other services assigned to several respective flats or dwellings, in a way to allow a remote meter reading.

On top of the obvious advantages which obtain from the automatic centralization of meter readings, the use of the network as a transmission path allows special transmission links between the central point and the meters to be dispersed with.

However, by reason of the uncertainty and distortion of its transmission characteristics and the presence of noise, the network is a difficult path to use for reliable data transmission.

In fact, examination of distribution network characteristics shows variations in attenuation as a function of frequency, with pronounced dips in transmission at some frequencies, such variations being different between one network and another.

Noise is of several types. Some is a fixed frequency signal resulting from the switching of inductive loads; this is impulse noise the amplitude of which may be relatively large. A second source of noise arises at harmonics of the frequency of the network, but these are sufficiently strongly attenuated above a few kHz.

There is also gaussian background noise the amplitude of which, by way of example, may be of the order of 1mV over a frequency band of 50 Hz centered at 100 kHz. There may also be fluctuating signals injected, such as those caused by televisions and intercoms.

To improve transmission security under such conditions wide band transmission has been proposed. Such a transmission process is described in U.S. Pat. No. 4,307,380.

More generally, it is known to use specific data coding and decoding methods to provide wide band transmission with a view toward increasing transmission security and deciphering immunity.

SUMMARY OF THE INVENTION

The invention concerns in a first aspect a method for wideband data transmission for sending data presented in the form of words made up of information elements which may take one of several values, and more particularly a method of this type according to which:

at transmission, each information element for sending is coded by a sequence of several different predetermined coding frequencies, a particular frequency combination being associated with each information element value, and a signal comprising said frequency being transmitted, and at reception, the received signal is input to demodulators to be correlated with locally generated signals which reproduce, with a substantially constant frequency shift, said particular frequency combinations, and the value of the information element being determined as a function of the correlation output.

The invention has as an object to provide such a process with which reliability of transmission and detection at reception are further increased.

This object is achieved by a process of the aforesaid type in which, in accordance with the invention:

at transmission, the predetermined coding frequencies are divided into at least two distinct frequency bands, spaced apart from each other, and the particular different coding combinations are chosen such that frequencies ranking the same sequence place in the combinations occupy different frequency bands, and at reception, the demodulators are assigned each to one of said respective frequency bands.

Coding frequency division into several bands spaced apart from each other reduces transmission sensitivity to attenuation variations in the transmission path as a function of frequency, leading to improved transmission reliability.

In an alternative arrangement for each demodulator assigned to one particular frequency band, there may be assigned to the input thereof a filter of corresponding pass band. Thus, each demodulator selects only received signal components that are in a band width limited with respect to that selected for transmission, which yields improved detection.

Detection quality comes not only through restriction of each demodulator to a particular frequency band, but equally because frequencies ranking the same place in the sequence of coding frequencies are placed in different bands. Thus, for a given sequence place, detection occurs in a particular demodulator dependent upon the value of the information element. This value is retrieved in combination with output information obtained from the demodulators for the different sequence places.

Thus, in the normal case where information for transmission is a numeric word formed of binary information elements (bits), a low bit (0) is coded by a predetermined sequence of N coding frequencies f1 to fN and a high bit (1) is coded by another predetermined sequence of these N frequencies. The coding frequencies are different one from another and are divided into two bands spaced one from the other. Coding is performed such that the $n^{th}$ frequency of the combination coding a 0 bit and the $n^{th}$ frequency of the combination coding a 1 bit do not occupy the same band, whatever the value of the number n between 1 and N inclusive. At reception, two demodulators are used which are respectively assigned to the two bands into which the coding frequencies are divided. The locally generated signals reproduce, with a substantially constant frequency shift, the two coding frequency combinations. Signal components which occupy one of the bands are applied to one of the demodulators while the other components which occupy the other band are applied to the other demodulator. In contrast to known decoders used in frequency shift wide band transmission systems, there is no demodulator dedicated to bit 0 and no demodulator dedicated to bit 1.

As already described, a method in accordance with the invention is more particularly aimed at information transmission over an electricity distribution network, between at least one transmitter and one receiver. In this case, a trigger signal is transmitted on the network and the information signal is output by the transmitter to the network in response to detection of the trigger signal.

Advantageously, in the case where transmission is between several transmitters and one receiver, the trigger signal is detected by each transmitter and an information signal is output by each transmitter after a predetermined delay, specific to each transmitter, following detection of the trigger signal.

In accordance with another aspect, the invention also has the object of providing a transmission system for putting the above method into practice.

This object is achieved by means of a transmission system including:

at least one transmitter having a frequency generator for generating predetermined sequences of coding frequencies as a function of the value of information elements to be transmitted, and a receiver having at least a local frequency generator for generating signals reproducing, with a substantially fixed frequency shift, said predetermined sequences, and demodulation means to which signals received by the receiver and said locally generated signals are applied to determine the value of the information elements corresponding to received signals, in which system according to the invention:

coding frequencies are divided into at least two distinct frequency bands spaced one from another and the frequency generator is arranged to provide coding combinations in which frequencies ranking the same sequence place are in different frequency bands, the demodulation means includes a plurality of demodulators each assigned to a respective one of said frequency bands, and a plurality of band-pass filters connected to branches between a common input, to which is applied a signal for demodulation, and the different demodulators respectively, a logic circuit being linked to the outputs of the different demodulators for determining the value of received signals as a function of the successive output signals of the demodulators.

For application to information transmission over a network between at least one transmitter and one receiver, the receiver may include a circuit with a trigger signal output to the network and each transmitter includes a trigger signal detection circuit to trigger information signal transmission in response to detection of the trigger signal.

It will also be appreciated that system triggering may be provided by an alternative transmission arrangement, for example transmission apparatus placed on the medium voltage network and triggering a plurality of systems connected to the low voltage network. Such an arrangement may be provided by using existing techniques, such as centralized remote-control. In this case, the system receiver for transmission on the low tension network is provided with means for receiving or detecting the trigger signal allowing the instant of system triggering to be determined.

In order to provide transmission between a plurality of transmitters and a single receiver, each transmitter signal detection circuit to trigger information signal transmission with a predetermined delay, specific to that transmitter, following detection of the trigger signal.

BRIEF DESCRIPTION OF THE DRAWING FIGURES

Other features and advantages of the method and system in accordance with the invention will be appreciated from reading the following description, given by way of non-limitative example, with reference to the accompanying drawings, of which.

DETAILED DESCRIPTION OF THE PREFERRED EMBODIMENT

Figure 1:
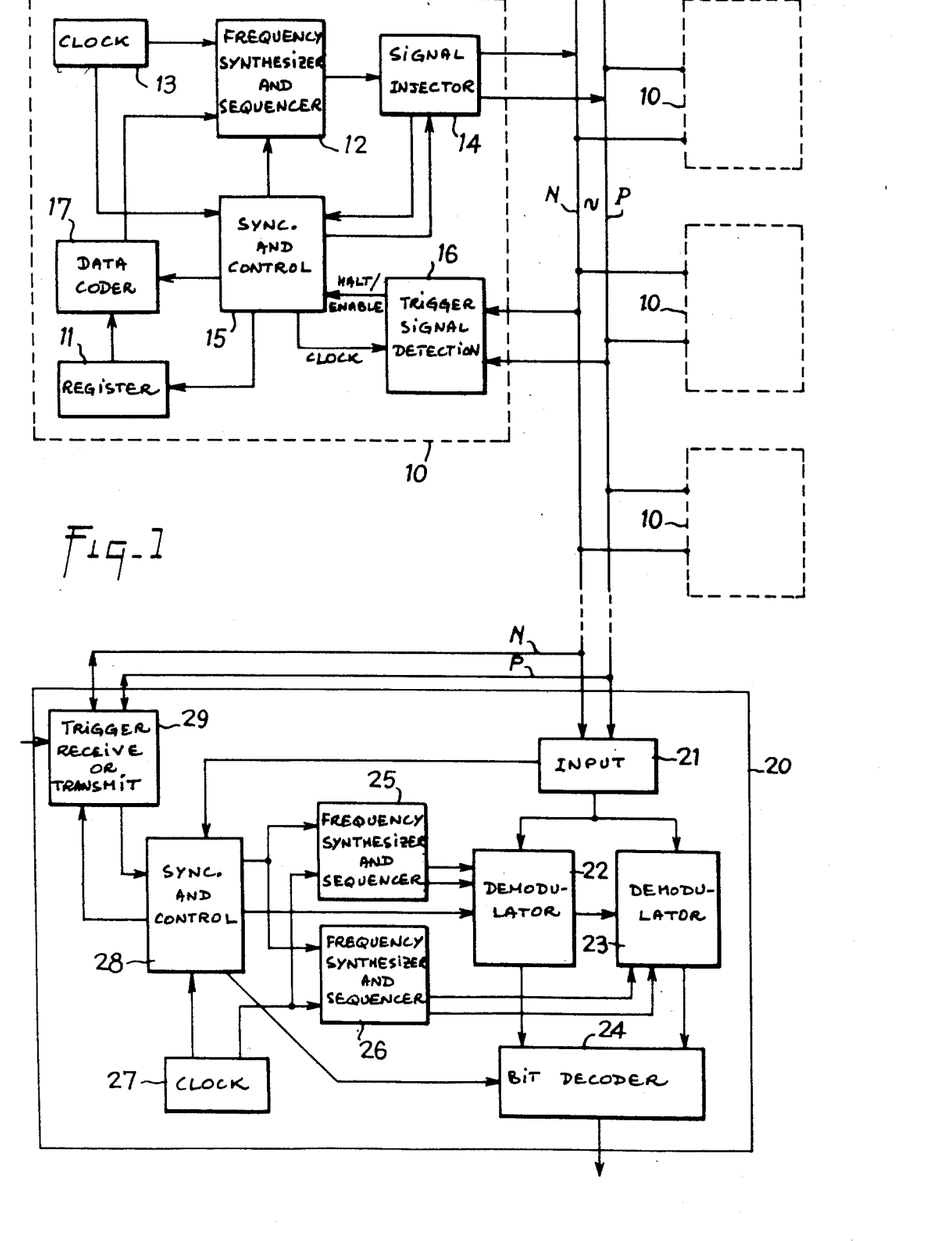
FIG. 1 is an overall diagram of a system constructed in accordance with the invention.

The transmission system shown schematically in FIG. 1 is designed for information transmission over a low tension network between a plurality of similar transmitters 10 and a single receiver 20 each connected between a line conductor P and a neutral conductor N. Each transmitter 10 is for example associated with a meter, such as an electricity meter, water or gas meter, assigned to one flat or dwelling. The receiver 20 is for example placed at the low voltage transformer station serving the flats or dwellings with which the transmitters are associated.

Each transmitter 10 comprises a register 11 where information to be transmitted is stored, such as, by way of non-limitative example the reading of a meter (not shown). This information is in the form of a digital word of several bits.

Figure 2:
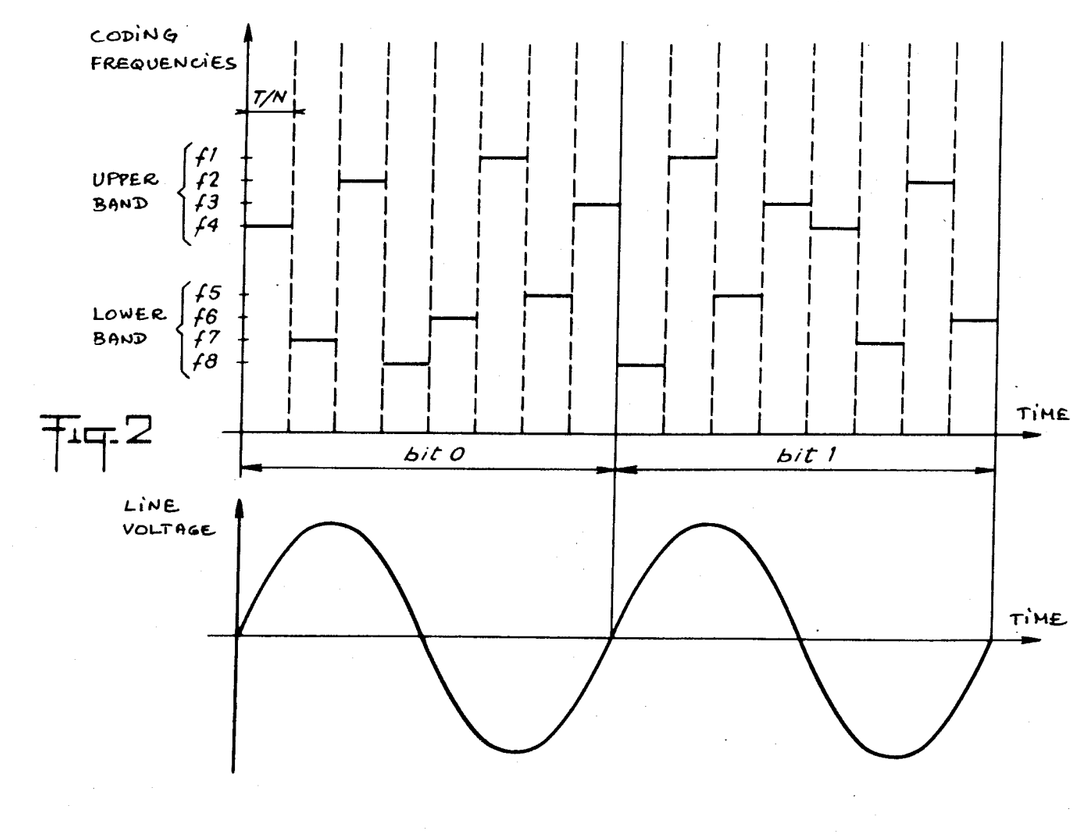
FIG. 2 illustrates an example of coding frequency combinations of a 0 bit and a 1 bit during two successive line signal periods.

A frequency systhesis and sequence generation circuit 12 receives each bit for transmission and converts each bit into the form of a signal made up of a predetermined sequence of coding frequencies. A first prearranged frequency combination is used for coding a low bit (0) and a second prearranged frequency combination is used for coding a high bit (1). Thus, for each bit, the signal produced by the circuit 12 is of the form of a train of frequency bursts the frequency of which varies stepwise periodically during the transmission of the bit, the bursts being generated by frequency division of a clock 13. An example of the successive frequency values used for bit coding is shown in FIG. 2. In this example, a 0 bit and a 1 bit are successively transmitted during two consecutive line signal periods T on the conductor P. The amplitude variation of this signal is also shown in FIG. 2; from which it may be seen that the start of each bit code is synchronized with the zero crossing of the network.

The bursts produced by the circuit 12 are used by a signal injector 14 to inject signals on the low voltage network along two connections to a line conductor P and a neutral conductor N.

A circuit 17 may be placed between register 11 and the frequency synthesizer 12 to add redundancy bits to the code. This addition allows the detection of erroneous bits at the receiver by using a matched decoder. All known coding methods may be used by the circuit 17.

The reading of bits from register 11, the data coding by circuit 17 and the operation of circuit 12 are controlled by synchronization signals produced by a synchronization circuit 15 from firstly a voltage derived from the network and secondly from a signal from clock 13.

A circuit 16 has inputs connected to the network for detecting a trigger signal sent over the network either from a central point at medium voltage in the case of a centralized remote control system, or from receiver 20. In response to detection of the trigger signal, the circuit 16 triggers the start of coded information signal transmission.

A plurality of transmitters being connected to the network, the detection circuit 16 of a transmitter comprises a delay circuit which defines a delay specific to that transmitter such that transmissions emanating from different transmitters follow the trigger signal transmission in predetermined order.

Receiver 20 includes an input circuit 21 having inputs connected to conductors N and P. After filtering and amplification passing through circuit 21, the received information signal is applied in parallel to two demodulators 22, 23 the outputs of which are connected to a bit decode circuit 24.

Each demodulator 22, 23 receives two out of phase signals at 90° to each other and outputs from a frequency synthesis and sequencing circuits 25, 26 respectively.

In accordance with one aspect of the invention, the coding frequencies used for transmission are, in this example, divided equally into two frequency bands spaced apart one from the other and, in the combination of N frequencies used to code 0 and 1 bits, the $n^{th}$ frequencies are not selected from the same band whatever the value n between 1 and N inclusive. This feature is apparent from the example shown in FIG. 2, in accordance with which eight coding frequencies f1 to f8 are used divided equally into an upper band and a lower band. In accordance with a further characteristic of the invention, demodulators 22 and 23 are respectively associated with one or another of the frequency bands. Thus, if demodulator 22 is associated with the upper band, it receives from circuit 25 two signals mutually out of phase by 90° which reproduce with a constant frequency shift, the N/2 coding frequencies of the upper band in the order of their use for coding of bits 0 and 1. Demodulator 23 receives similarly from circuit 26 two signals mutually 90° out of phase which reproduce, with a constant frequency shift, the N/2 coding frequencies of the lower band, in the order of their use for the coding of bits 0 and 1.

Preferably, the coding frequency sequences of bits 0 and 1 are chosen such that the time interval T/N during which any frequency is transmitted, be it in the upper band or the lower band, for coding a 1 bit does not follow nor preceed the time interval during which the same frequency is transmitted for coding a 0 bit. As in the example shown in FIG. 2. In this way, when there is temporary slippage in synchronization between receiver and transmitter, the aliasing between the code for a 1 bit and for a 0 bit is minimized.

As will be explained in more detail hereinafter, the combined use of a constant frequency shift and two locally generated signals with a mutual phase difference of 90° allows intermediate frequency detection with a single-side band.

Signals produced by circuits 25 and 26 are waveforms, the frequency of which varies stepwise with the same period as that used in transmission, and are generated by frequency division of a clock 27.

Operation of circuits 25, 26 is controlled by synchronization signals output by a synchronization circuit 28 in response to on the one hand a signal derived from the network voltage, and on the other a signal from clock 27.

A trigger circuit 29 is connected to conductors N and P, either for transmission of a trigger signal itself, or for receiving the system trigger command, transmitted from a central point (for example via the medium voltage system controlled from the remote control center).

The various circuits making up a transmitter 10 and receiver 20 of the transmission system of FIG. 1 will now be described in more detail with reference to FIGS. 3 to 12.

Figure 3:
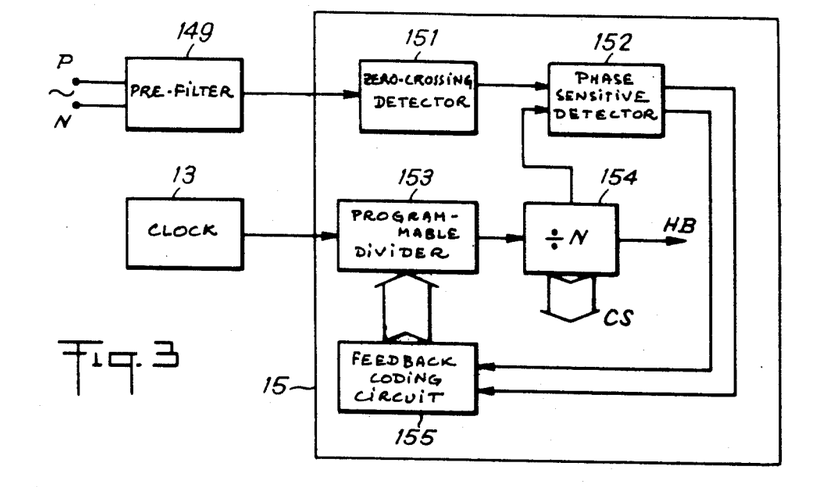
FIG. 3 is a more detailed plan of the transmitter synchronization circuit of FIG. 1.

FIG. 3 shows the synchronization circuit of a transmitter. Signal correlation at reception requires not only frequency information but also timing information. All the transmitters 10 must therefore be synchronized with receiver 20. Synchronization is derived from detection of the zero-crossing of the network voltage. To this end, circuit 15 has two inputs respectively connected to N and P conductors through the agency of a pre-filter 149 which, in the example shown, is configured within signal injector 14. Pre-filter 149 is a band pass filter for attenuating network harmonics (50 Hz or 60 Hz) and the transmit-receive signals.

Output signal of pre-filter 149 is shaped by circuit 151 which detects zero crossings and provides a square wave logic signal at network frequency. Taking account of the problems associated with a slow transition, it is preferable that the shaping circuit 151 has hysteresis (for example a Schmitt trigger) to prevent jitter caused by noise around the zero-level.

Output of shaping circuit 151 enters a phase sensitive detector 152 the other input of which is connected to the output of a divide by N frequency divider 154. The phase sensitive detector 152 has two outputs connected to feedback coding circuit 155. A signal is output on one or other of the outputs of phase sensitive detector 152 according to the sense of the phase difference between the signals received by the detector having an amplitude which is a function of this phase difference. Circuit 155 converts the signal received from the phase sensitive detector 152 into a digital feedback code which fixes the division coefficient of programmable frequency divider 153 connected between clock 13 and the frequency divider 154. Circuits 152, 153, 154 and 155 form a phase-locked loop (PLL) the clock for which is provided by circuit 13 of the transmitter. The form and function of such a phase locked loop is well known and therefore does not require further description.

Division coefficient N of divider 154 is constant and equal to the number of frequencies used to give the coding combination for each 0 or 1 bit during the network period. Divider 154, in the form of a counter to base N, provides a stepped digital coefficient CS which, during each network period, takes successively values 0 to N-1, returning to 0 at the start of the following period. Stepped coefficient CS is used by frequency synthesiser 12 to identify the time intervals for each frequency step. Furthermore, divider 154 gives a bit frequency signal HB (bit clock) for use in other system components to control events which must be synchronized to the bit decoding.

Use of the phase locked loop described above allows efficient tracking of the frequency of synchronization signals with those of the network, despite variations in the latter about its nominal value. For good accuracy, it is preferable to use a second order phase locked loop.

Figure 4:
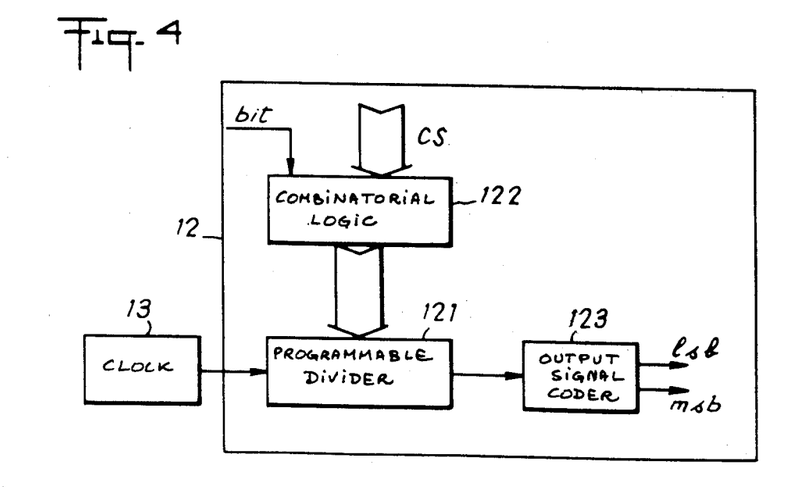
FIG. 4 is a more detailed plan of the frequency synthesis and sequencing circuit forming part of the transmitter of the system of FIG. 1.

FIG. 4 illustrates the frequency synthesis and sequencing circuit 12. Each information bit to be transmitted is coded by a sequence of N predetermined coding frequencies, for example 8 frequencies. The coding frequencies are generated by frequency division of the clock 13 by means of a programmable divider of the clock 13 by means of a programmable divider 121 connected between the clock 13 and output coding circuit 123.

The division coefficient of programmable divider 121 is provided by a combinatorial logic circuit 122, which receives on the one hand the bit to be coded, and on the other, the step coefficient CS given by synchronization circuit 15 described above. The bit for coding is read at the bit rate from the register 11 or the data coding circuit 17 if this is included.

Combinatorial logic circuit 122 transforms the step coefficient identifying a time interval within the network period into a division coefficient which is a predetermined function of the bit to be coded. Thus, a train of bursts is output from the divider 122 the frequency of which varies within the network period in synchronism with the steps defined by the synchronization circuit. In the example shown, the digital word provided by circuit 122 is a predetermined logical combination of the digital word representing the step coefficient together with the bit for transmission. Alternatively, the step coefficient and the bit for transmission may be used as parts of an address to read the coefficient to be applied to divider 121 from a Read Only Memory.

Figure 5:
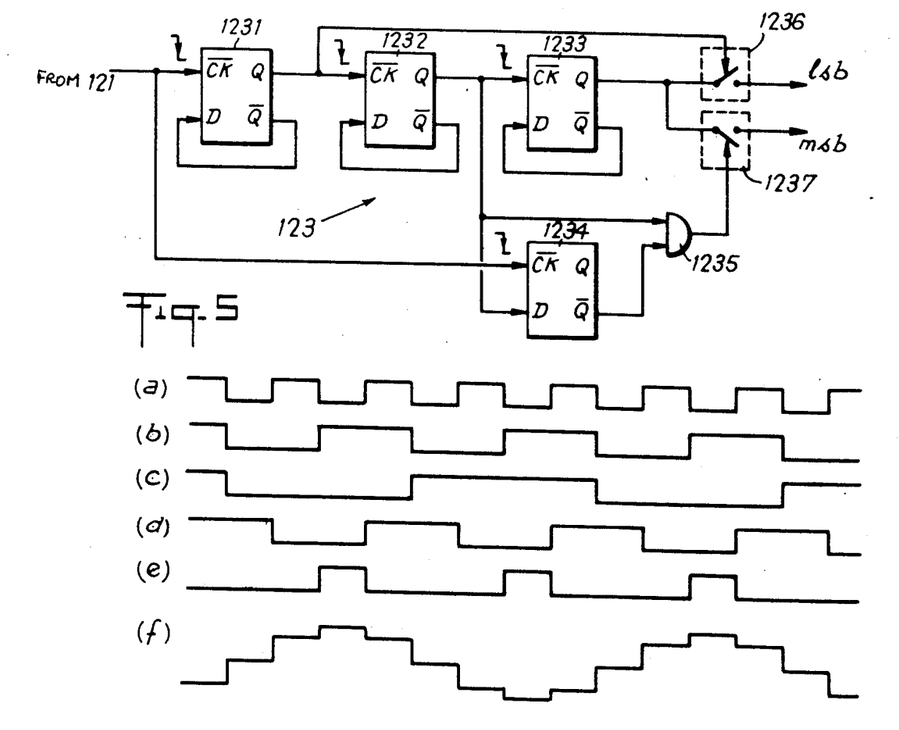
FIG. 5 illustrates in a more detailed way an arrangement of the output coding of the circuit of FIG. 4 and waveforms at different points within the output coding circuit.

A way of constructing output coding circuit 123 useful in conjunction with signal injector 14 described later is shown in FIG. 5.

Output coding circuit 123 includes three cascaded flip-flops 1231, 1232, 1233 each arranged to divide by two, each flip-flop being clocked by the negative edge of the received signal. The frequency of the output signal of the divider 121 is thus divided by two by flip-flop 1231, again by two by flip-flop 1232 and finally by two by flip-flop 1233. Curves (a), (b) and (c) represent Q output signals of the flip-flops 1231, 1232, 1233. Q outputs signals of the flip-flop 1232 is also connected to the data input D of a fourth flip-flop 1234 and to one input of two input AND-gate 1235. The output of divider 121 is connected to the clock input CK of flip-flop 1234 and its inverse output Qbar is connected to the second input of the gate 1235, thus forming a monostable circuit with the latter. Curves (d) and (e) represent the Q output signal of flip-flop 1234 and the output of gate 1235. The Q output of flip-flop 1233 is connected to a first output lsb of the coder 123 through the agency of a switch 1236 controlled by the Q output of flip-flop 1231, and the same Q output of flip-flop 1233 is connected to a second output msb of coder 123 through the agency of a switch 1237 controlled by the output of gate 1235. As discussed later, signals on the lsb and msb outputs are applied to a digital-analogue converter in signal injector 14 to give a staircase signal approximating a sinusoid (curve (f) of FIG. 5) the fundamental frequency of which is one-eighth of the output of divider 121. In the example described, the number N of different frequencies used to code each bit equals eight. As will be realized a number other than eight could be selected. By way of example, starting with a master clock of 4.194 MHz (approximately $2^{22}$), and with division coefficients of divider 121 respectively of 6, 7, 8, 9, 10, 11, 12, 13 at the output of circuit 12, by virtue of the division of eight introduced by coder 123, the frequencies f1 to f8 are equal to 87.4 kHz, 74.9 kHz, 65.5 kHz, 58.2 kHz, 52.4 kHz, 47.6 kHz, 43.7 kHz and 40.3 kHz respectively.

The tri-state signals at output lsb and msb of coder 123 are then applied to the input of signal injector 14 (FIG. 6) and are combined by a resistance ladder of a digital-analog converter 141 to give a sinusoidal type staircase signal shown as curve (f) of FIG. 5.

Figure 6:
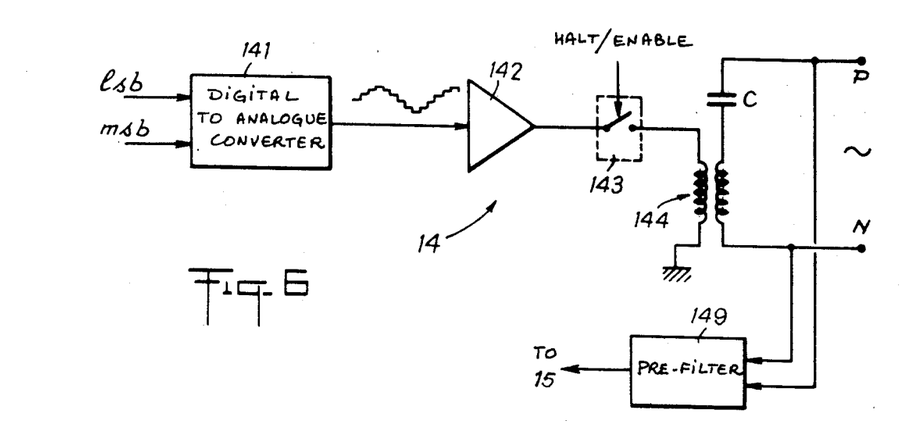
FIG. 6 is a more detailed plan of the signal injection circuit forming part of the transmitter of the system of FIG. 1.

Output signal of the converter 141 is applied to the input of a linear amplifier 142 having a band pass filter with a cut-off frequency lying beyond the highest coding frequency and which serves to smooth the sharpest discontinuities at the output of the converter 141. The amplifier 142 is arranged to provide an average power of the order of 50 to 250 mW to excite the network.

A commutator 143 is connected to the output of amplifier 142 and is controlled by a halt/enable signal provided by detection circuit 16 to close the commutator 143 in response to a trigger signal. In the non-transmission mode, the commutator 143 represents a high impedance to the electricity network for the frequency band used; in this way, signals transmitted by the signal injectors of another transmitter, and sent over the same low voltage network are not attenuated. By contrast, in transmission mode, the commutator 143 is closed and the low output impedance of amplifier 142 ensures injection of a suitable voltages (for example effectively 1 V) even though the network presents a low impedance characteristic. An impedance transformer 144 is placed between commutator 143 and the electrical network. The primary connects between the commutator output and the transmitter ground. The secondary carries fewer turns than the primary, is isolated therefrom, and is connected in series with a capacitor C between neutral conductor N and line conductor P. Capacitor C provides strong power signal attenuation at the network frequency and prevents it from damaging amplifier 142 through transformer 144. Furthermore, capacitor C presents a low impedance at high frequency allowing low loss coupling of the transmitter output to the network.

Transmitter 10 also includes power supply circuits (not shown) designed to provide the supply voltages required for the transmitter circuits to operate. The supply voltages are obtained by rectifying network derived voltages.

Figure 7:
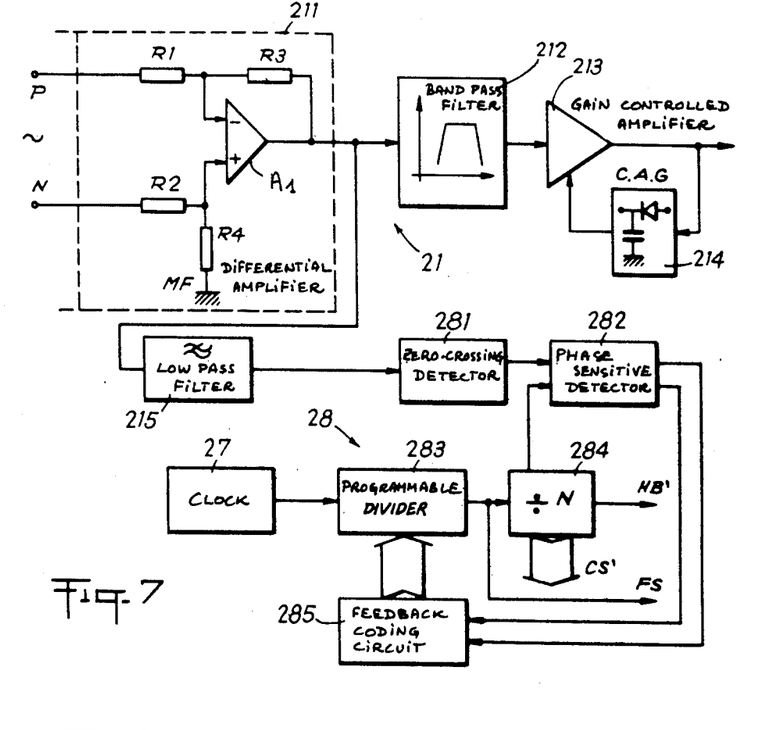
FIG. 7 is a more detailed plan of the input signal processor forming part of the receiver of the system of FIG. 1.

Reference may now be made to FIG. 7 where a receiver input and synchronization circuit of the receiver 20 are shown.

Input circuit 21 includes a differential amplifier 211 having a first path including a resistor R1 connected between the P conductor and the inverting input of an operation amplifier A1, and a second path including a resistor 2 connected in series between the N conductor and the non-inverting input of amplifier A1. The output of amplifier A1 is connected to its inverting input by a resistor R3 whilst a resistor R4 connects the non-inverting input to floating earth Mf.

The output of the differential stage 211 connects to a band pass filter 212 which attenuates network low frequencies (principally the network frequency and its harmonics) and limits the upper band beyond the highest coding frequency used (for example about 100 kHz).

The output of filter 212 is conditioned by a gain controlled amplifier 213, the gain control circuit connected between amplifier output and input having a peak detector 214. Thus, when the signal superimposed on the network voltage is of an amplitude which varies through changes in attenuation with the frequency band used, or the presence or not of pick-up, amplifier saturation, together with the distortion and unintentional frequency mixing that would result, is avoided. Automatic gain control also provides amplifier output signals which do not fall below the minimum amplitude for detection.

FIG. 7 also shows synchronization circuit 28. It is similar to transmitter circuit 15 and likewise uses network voltage.

The output signal of the differential stage 211 is filtered by means of a pass band filter 215 admitting the network frequency and is shaped by means of a circuit 281 which detects zero-crossings and provides a network frequency square wave logic signal. The output phase sensitive detector 282, feedback coding circuit 285, programmable frequency divider 283 and a divide by N frequency divider, 284. This phase locked loop operates in the same way as that formed by components 152, 153, 154 and 155 of circuit 15 described above, and uses receiver clock 27. This clock is preferably at a greater frequency than transmitter clock 13, in order to increase accuracy in frequencies generated by clock frequency division so as to demodulate received information with a substantially constant intermediate frequency. Additionally, programmable divider 283 has a greater number of stages than the divider 153 of transmitter circuit 15. In other respects, the transmitter and receiver phase locked loops have the same characteristics, defined by the feedback coding circuit, such that transmitter and receiver are synchronized independent of network frequency variations.

Synchronization circuit 28 provides digital step coefficient CS' and a bit rate signal HB' in like manner to transmitter circuit 15. Additionally, circuit 28 provides a step frequency signal FS, obtained from the output of a divider 283 and for the purpose of resetting demodulator filter elements 22, 23 to zero.

Figure 8:
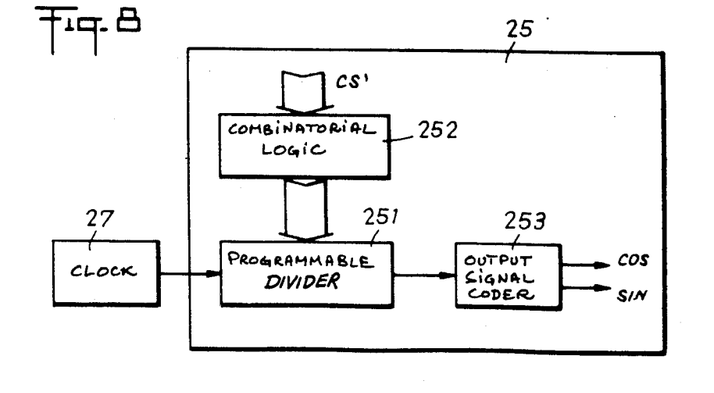
FIG. 8 is a more detailed plan of frequency synthesis and sequence trigger circuit forming part of the receiver of the system of FIG. 1.

Frequency synthesis and sequencing circuits 25 and 26 provide the necessary frequencies for decoding the received signal to the demodulators. Circuits 25, 26 are analogous to the corresponding circuit 12 of the transmitter. FIG. 8 shows one of the circuits 25 or 26, for example circuit 25.

A programmable frequency divider 251 receives the signal from clock 27 and divides its frequency by a coefficient given by combinational logic circuit 252 as a function of the step coefficient CS' received from circuit 28. Contrary to transmitter frequency synthesizer logic circuit 122, logical circuit 252 does not receive a bit additional to the step coefficient. The output signal of divider 251 is transformed by an output coding circuit 253 into two signals SIN and COS mutually out of phase by 90° for connection to the demodulator 22 associated with circuit 25.

Figure 9:
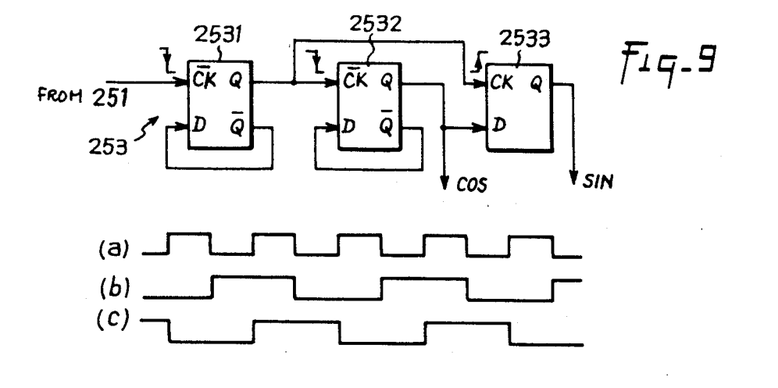
FIG. 9 shows in a more detailed way an arrangement of the output coding circuit of the circuit of FIG. 8 and waveforms at different points within the output coding circuit.

As may be seen in FIG. 9, output coding circuit 253 includes two flip-flops 2531 and 2532 arranged to divide by two and connected in series, each flip-flop being triggered by the negative edge of the received signal. At output Q of flip-flop 2532, there is a signal COS, the frequency of which is equal to one quarter of the output signal of the divider 251. A third flip-flop is positive edge triggered by output Q of flip-flop 2531 and receives the COS signal at its data input D. Q output of flip-flop 2533 provide a signal SIN, out of phase 90° with respect to the COS signal and of the same frequency. The Q output states of flip-flops 2531, 2532 and 2533 are represented by curves (a), (b), (c) of FIG. 9.

In accordance with a feature of the invention, frequencies f1 to fN used for coding bits for transmission are divided into two distinct bands: f1 to f(N/2) and f((n/2)+1) to fN. In the two frequency combinations coding bits 0 and 1, frequencies ranking the same sequence place are chosen in such a way as not to occupy the same band; moreover, when one frequency is used in the $n^{th}$ position of the combination coding a 1 bit, use of the same frequency at the $(n-1)^{th}$ or $(n+1)^{th}$ sequence place in the combination coding a 0 bit is avoided (see FIG. 2).

Locally generated frequencies f'1 to f'N in the receiver have values shifted by a substantially constant amount fI with respect to the values of frequencies f1 to fN used in the transmitter and, in accordance with another aspect of the invention, receiver demodulators 22 and 23 are respectively assigned to the upper band, frequencies f'1 to f'(N/2), and to the lower band, frequencies f'((N/2)+1) to f'N.

Furthermore frequency synthesis circuit 25, associated with demodulator 22, is arranged to generate a sequence of N frequencies chosen from the N/2 frequencies of the upper band f'1 to f'(N/2), the $n^{th}$ frequency of this sequence corresponding, apart from the fI shift, to the $n^{th}$ frequency fn1 of the combination coding a 1 bit or the $n^{th}$ frequency fn0 of the combination coding a 0 bit in accordance with fn1 or fn0 and in the upper band (only one of these being required). In the same way frequency synthesis circuit 26 associated with demodulator 23 generates a sequence of N frequencies chosen from the N/2 lower band frequences f'((N/2)+1) to f'N, the $n^{th}$ frequency of this series corresponding, apart from the fI shift, to the $n^{th}$ frequency fn1 of the combination coding a 1 bit or the $n^{th}$ frequency fn0 of the combination coding a 0 bit according to fn1 or fn0 and in the lower band. By way of illustration, if in the example described above coding is by means of eight frequencies f1 to f8 going from 87.4 kHz to 40.3 kHz, and given a frequency for the clock 27 equal to 18 MHz, the division coefficients used in the programmable divider 251 of circuit 25 are equal to 55, 65, 75 and 85 and those used in the corresponding programmable divider of circuit 26 are equal to 96, 107, 118 and 129. Given the division by four made by the output coding circuit producing the SIN and COS, the values of the frequencies generated locally at the receiver are, for the upper band, f'1=81.8 kHz, f'2=69.2 kHz, f'3=60.0 kHz, f'4=52.9 kHz and, for the lower band f'5=46.9 kHz, f'6=42.1 kHz, f'7=38.1 kHz, and f'8=34.9 kHz. Intermediate frequency fI therefore has a substantially constant value, on average equal to 5.54 kHz.

Figure 10:
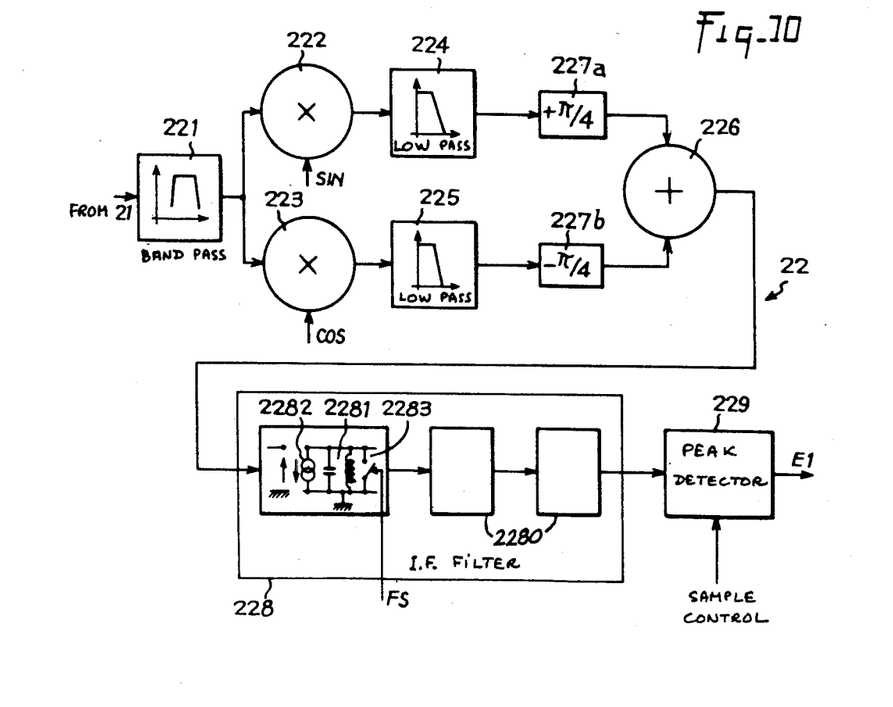
FIG. 10 is a more detailed plan of the demodulator of the receiver of the system of FIG. 1.

Both demodulators 22 and 23 are similar so only demodulator 22 will be described, with reference to FIG. 10.

A band pass filter 221 is arranged at the input of demodulator 22 and receives the output signal of amplifier 213 of input circuit 21. The action of this filter is to attenuate all the frequencies outside the band assigned to the demodulator.

The output of filter 221 is connected in parallel to two multiplication paths each comprising an analogue multiplier 222, 223 in series with a low pass filter 224, 225. Multipliers 222, 223 receive in addition SIN and COS signals respectively generated locally in circuit 25. The outputs of filters 224, 225 are combined by means of an adder 226, following phasing mutually 90° out of phase by means of phasers 227a, 227b which alter the phase of the outputs of filters 224, 225 by +45° and −45° respectively.

Multiplication of the received signal with locally generated signals is for frequency translation, allowing the signal to be recovered at intermediate frequency fI. Use of a single multiplier would give double side band reception, one representing the useful sought signal and the other noise. For this reason two multiplier channels are used in a way known in its own right to give single side band detection, the channels receiving local signals in quadrature and an addition phase change of 90° being introduced between the two channels before summing the mixed frequencies.

Output of adder 226 goes to a band pass filter 228 centered on intermediate frequency fI. Intermediate frequency filter 228 is made up of several second order stages connected in cascade and its output passed to peak detector 229, the output level of which represents energy detected at the frequency of the sought signal.

Each stage 2280 of filter 228 (one of which is shown in more detail in FIG. 10) is formed with a LC type parallel resonant circuit 2281 excited by current generator 2282 controlled by the input voltage applied to that stage. Placement of several (k) stages having different characteristics in cascade allows a filter of order 2k to be optimally realized to pass the wanted band and to strongly attenuate out-of-band signals.

A commutator 2283 is parallel connected with the resonant circuit 2281 of each stage to allow reset to zero of the output of filter 228 at the frequency step rate (signal FS provided by circuit 28). In this way, at each new frequency, the last resonant state is cleared so that energy is only received during a frequency step. Thus, the detection made by bit determination circuit 24 is, at each step, independent of previous states.

In the same way, peak detection circuit 229 is reset to zero at each jump and sample control input of peak detector 229 is enabled only towards about the middle of the step period, by delaying signal FS giving the frequency step rate. Detecting resonant circuit output level of filter 228 immediately after filter reset, at a moment when the filter stage given non-negligable output noise, is thus avoided. An analysis window is therefore defined to cover the end of each period during which the response of the stages is representative of the received signal.

By virtue of the fact that the demodulators 22, 23 are not assigned to a state (0 or 1) but a frequency band, demodulator output signal processing is required to recover the value of a received bit. This processing is performed by circuit 24 of FIG. 11.

Figure 11:
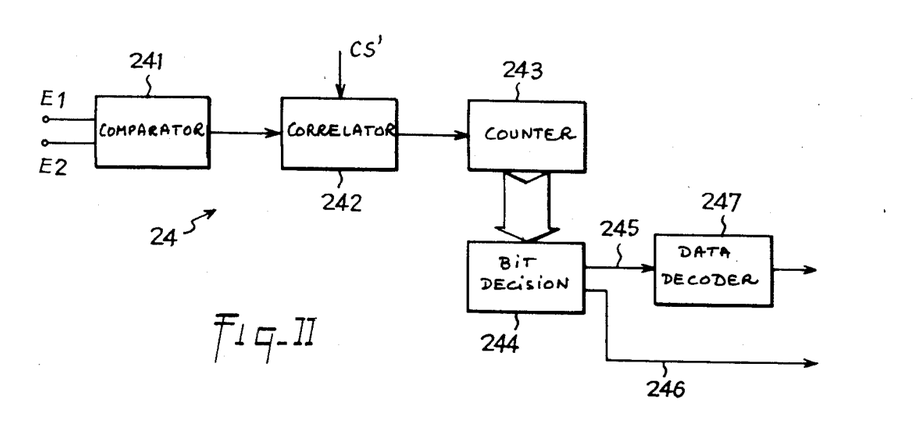
FIG. 11 is a more detailed plan of the decoding logic circuit connected to the demodulator output of the receiver of the system of FIG. 1.

Comparator 241 receives signal E1 and E2 available at the output of demodulators 22 and 23 and provides a 1 or 0 logic level signal according to whether the energy detected by demodulator 22 is greater or less than that detected by demodulator 23.

Logical correlation circuit 242 is designed to compare successive states of the output of comparator 241, at the step rate (N times the network frequency, or 400 kHz in the exaple considered with 50 Hz mains), with the values they out to take when the received bit it 1 (or 0). The results of these comparisons given by successive part bits are accumulated by a counting circut 243 during transmission of a complete bit, that is a mains cycle as shown in FIG. 2. The counter is reset to zero at the start of each bit. The state of counter 243 is interpreted by logic circuit 244 at the end of each bit, to output on conductor 245 a logic 1 state if the overall result favors a 1 (more than four decisions out of eight favoring a 1) or a logic 0 state if the overall results favors a 0 (less than four decisions out of eight favoring a 1). When the overall result favours neither a 1 nor a 0 (four comparisons out of eight in favour of a 1), this case is classed as noise and second output 246 enabled. It will be noted that it would be possible to code each bit by sequence of an odd number of frequencies to provide in all cases a majority decision. Moreover the number of possible outputs to be interpreted as noise may be increased to have greater reliability in the decisions taken on bit values.

Described above is a simple comparison of energies detected by the demodulators. Other detection arrangements may be suggested, for example by weighting the contribution of each part bit detection as a function of the size of the difference between the energy levels detected by the demodulators.

In the case where coding circuit 17 is used during transmission, the output of logic circuit 244 is connected to a decoder 247 which has the inverse function of circuit 17, that is detection and, finally, correction of erroneous bits.

The system trigger command may be sent from a central point at medium voltage (remote control system), or from the receiver 20 situated on the low voltage side.

In the case where central remote control is employed, trigger word reception circuit 29 of receiver 20 is similar to the trigger word reception circuit situated at the transmitter.

Figure 12:
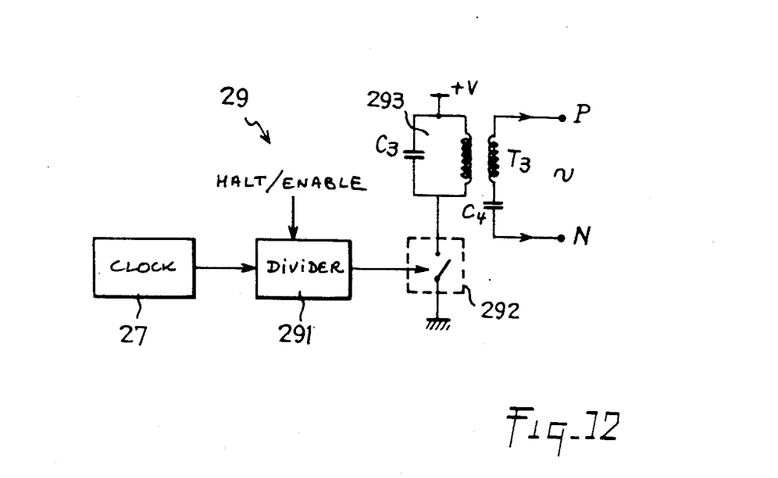
FIG. 12 is a more detailed plan of a circuit which may be used to trigger the system from the receiver of the system of FIG. 1.

In the case where central remote control is not used, circuit 29 includes the trigger signal transmitter. One way of providing such a transmission circuit is shown in FIG. 12, using a commutator and a resonant circuit working in class D.

Frequency divider 291 gives a series of excitation pulses derived from clock 27. The division coefficient is constant and selected such that the divider output frequency falls in the middle of the pass band of the output filter of circuit 29.

Divider 291 includes an additional control input to enable or halt the divider to produce at the output modulation by all or nothing.

Thus the modulation codes normally used in a central remote control system may be output.

The output of divider 291 controls a commutator 292 series connected with resonant circuit 293 between ground and a +V supply voltage terminal. Resonant circuit 293 includes a capacitor C3 in parallel with the primary of a transformer T3. The output of circuit 29 is given by the secondary of the transformer T3 connected in series with capacitor C4 between the neutral conductor N and the line conductor P; this output is analogous to that of the signal injector 14 of the transmitter. It will be noted here that the injection method used in circuit 29 described above may equally well be used in transmitter signal injector circuits.

The trigger signal output by circuit 29 is detected by circuit 16 of the transmitter. Detection circuit 16 may be made up of a remotely controllable relay such as that described in U.S. Pat. No. 4,361,766. This known relay is designed to control a desired operation following a programmable delay counted from the reception of a command in the form of signals superimposed on the voltage of the distribution network to which the relay is connected.

We claim:

1. A method for wideband transmission and reception of data over an electricity distribution network for use by a least a data transmitter and a data receiver thereon, the data taking the form of words made up of information elements which may take one of several values, comprising the steps of:
   (a) coding each information element for transmission by assigning a sequence of several different predetermined coding frequencies with a particular frequency combination being associated with each information element value, wherein the predetermined coding frequencies are divided into at least two distinct frequency bands which are spaced apart from each other and particular coding combinations are chosen such that frequencies ranking the same sequence place in the combinations occupy different frequency bands, and wherein at least some pairs of frequencies in corresponding sequence places of different information element values, and further wherein each information value contains frequencies in both said frequency bands;
   (b) transmitting said coded information elements at said predetermined frequencies as an information signal over a communications channel on said network; and
   (c) receiving said transmitted signal over said communications channel, comprising the steps of:
      (i) applying the received signal to a pair of demdoulators, the demodulators being assigned to each of one of said respective frequency bands,
      (ii) generating local signals, said locally generated signals reproducing, with a substantially constant frequency shift, said particular frequency combinations,
      (iii) applying said locally generated signals to the demodulators, and
      (iv) correlating said received signal with said locally generated signals to determine the value of the received information element as a function of said correlation.

2. The method of claim 1, wherein in step (a) the time interval during which an information element coding frequency is generated is selected so as to not follow or precede the time interval during which the same frequency is used for coding an information element of another value.

3. The method of claim 1 wherein just prior to step (c)(i) the signal applied to each demodulator is filtered by a filter having a passband corresponding to that which the demodulator is assigned.

4. The method of claim 1 further comprising the steps of generating a trigger signal and transmitting the trigger signal over the network, detecting the trigger signal by means of a trigger signal detector at each transmitter, and in response to detection of the trigger signal causing the transmitter to transmit the information signal over the network.

5. The method of claim 1 wherein there are a plurality of transmitters and one receiver, further including the step of delaying by predetermined and different times the transmission of the information signal from each transmitter following detection of said trigger signal.

6. The method of claim 1 wherein steps (a) through (c)(i–iv) are synchronized to the frequency of alternating current flowing over said electricity distribution network.

7. A wideband transmission on an electricity distribution network system for transmission of information taking the form of words made up of information elements which may take one of several values, the system comprising:
   at least one transmitter comprising means for generating predetermined sequences of coding frequencies as a function of the value of information elements to be transmitted, wherein said coding frequencies are divided into at least two distinct frequency bands spaced one from another and particular coding combinations are chosen so that frequencies ranking the same sequence place are in different frequency bands, and wherein at least some pair sof frequencies in corresponding sequence places of different information element values are unique, and further wherein each information value contains frequencies in both said frequency bands;
   means for appling said coded information elements at said predetermined frequencies as an information signal to a communications channel; and
   a receiver coupled to said communications channels for receiving said information signal, the receiver comprising a local frequency generator for generating signals reproducing, with a substantially fixed frequency shift, said predetermined sequences, and at least a pair of demodulators, each demodulator being assigned to a respective one of said frequency bands and coupled to the communications channel by means of a band pass filter, said information signals and said locally generated signals being applied to said demodulator, and a logic circuit coupled to the outputs of the demodulators, said logic circuit including means for determining the value of received signals as a function of the successive output signals of the demodulators.

8. The system of claim 7 wherein the receiver includes means for receiving or transmitting a trigger signal from or to the network and each transmitter includes a trigger signal detection circuit for controlling the transmission of an information signal in response to detection of the trigger signal.

9. The system of claim 7 wherein there are a plurality of transmitters and one receiver and the trigger signal detection circuit at each transmitter includes delay means for controlling information signal transmission with a predetermined delay specific to that transmitter following trigger signal detection.

10. The system of claim 7 wherein both said transmitter and receiver include means for synchronizing their operation to the frequency of alternating current flowing over said electricity distribution network.

11. The system of claim 7 wherein each demodulator includes two multipliers respectively receiving two step-wise variable frequency quadrature signals, local signal generators and phasing means for generating output signals from the two multipliers which are out of phase by 90°, and a combination circuit connected to the phasing means to produce a sideband intermediate frequency signal.

* * * * *